(12) United States Patent
Rouse et al.

(10) Patent No.: US 6,539,720 B2
(45) Date of Patent: Apr. 1, 2003

(54) GENERATED SYSTEM BOTTOMING CYCLE

(75) Inventors: Gregory C. Rouse, Westlake Village, CA (US); Bill Treece, La Mesa, CA (US); Jeff Willis, Los Angeles, CA (US); David Calta, Newbury Park, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/985,789

(22) Filed: Nov. 6, 2001

(65) Prior Publication Data

US 2002/0066270 A1 Jun. 6, 2002

Related U.S. Application Data

(60) Provisional application No. 60/246,135, filed on Nov. 6, 2000.

(51) Int. Cl.$^7$ ............................................. F01K 25/08
(52) U.S. Cl. ......................... 60/651; 60/671; 60/39.182
(58) Field of Search ....................... 60/39.182, 651, 60/671

(56) References Cited

U.S. PATENT DOCUMENTS

| | | | |
|---|---|---|---|
| 3,796,045 A | * 3/1974 | Foster-Pegg | ............... 60/39.02 |
| 4,143,515 A | * 3/1979 | Johnsen | ....................... 60/648 |
| 4,199,961 A | * 4/1980 | Carter et al. | ................... 62/535 |
| 5,529,398 A | 6/1996 | Bosley | |
| 5,622,044 A | * 4/1997 | Bronicki et al. | .......... 60/39.182 |
| 5,632,143 A | * 5/1997 | Fisher et al. | ............. 60/39.182 |
| 5,791,868 A | 8/1998 | Bosley et al. | |
| 5,964,663 A | 10/1999 | Stewart et al. | |
| 6,037,687 A | 3/2000 | Stewart et al. | |
| 6,050,083 A | * 4/2000 | Meckler | ................... 60/39.182 |
| 6,173,563 B1 | * 1/2001 | Vakil et al. | ................. 60/39.04 |
| 6,223,523 B1 | * 5/2001 | Frutschi | ...................... 60/39.05 |

* cited by examiner

*Primary Examiner*—Hoang Nguyen
(74) *Attorney, Agent, or Firm*—Pillsbury Winthrop LLP; Paul Chancellor

(57) ABSTRACT

A closed loop Rankine bottoming cycle including a heat exchanger coupled to an exhaust port of a first turbogenerator for heating a pressurized refrigerant into a gaseous phase, and a second turbogenerator (e.g., a turbo expander) coupled to the heat exchanger for expanding the gaseous phase so as to create power. Also included is a cooling mechanism coupled to an exhaust of the second turbogenerator for cooling the gaseous phase exhausted by the second turbogenerator into a liquid phase, and a pumping mechanism for pressurizing the liquid phase into the pressurized refrigerant heated by the heat exchanger. A computer program product and method for operating and synchronizing the generator included in the closed loop, so as to optimize the overall system efficiency is also included.

51 Claims, 8 Drawing Sheets

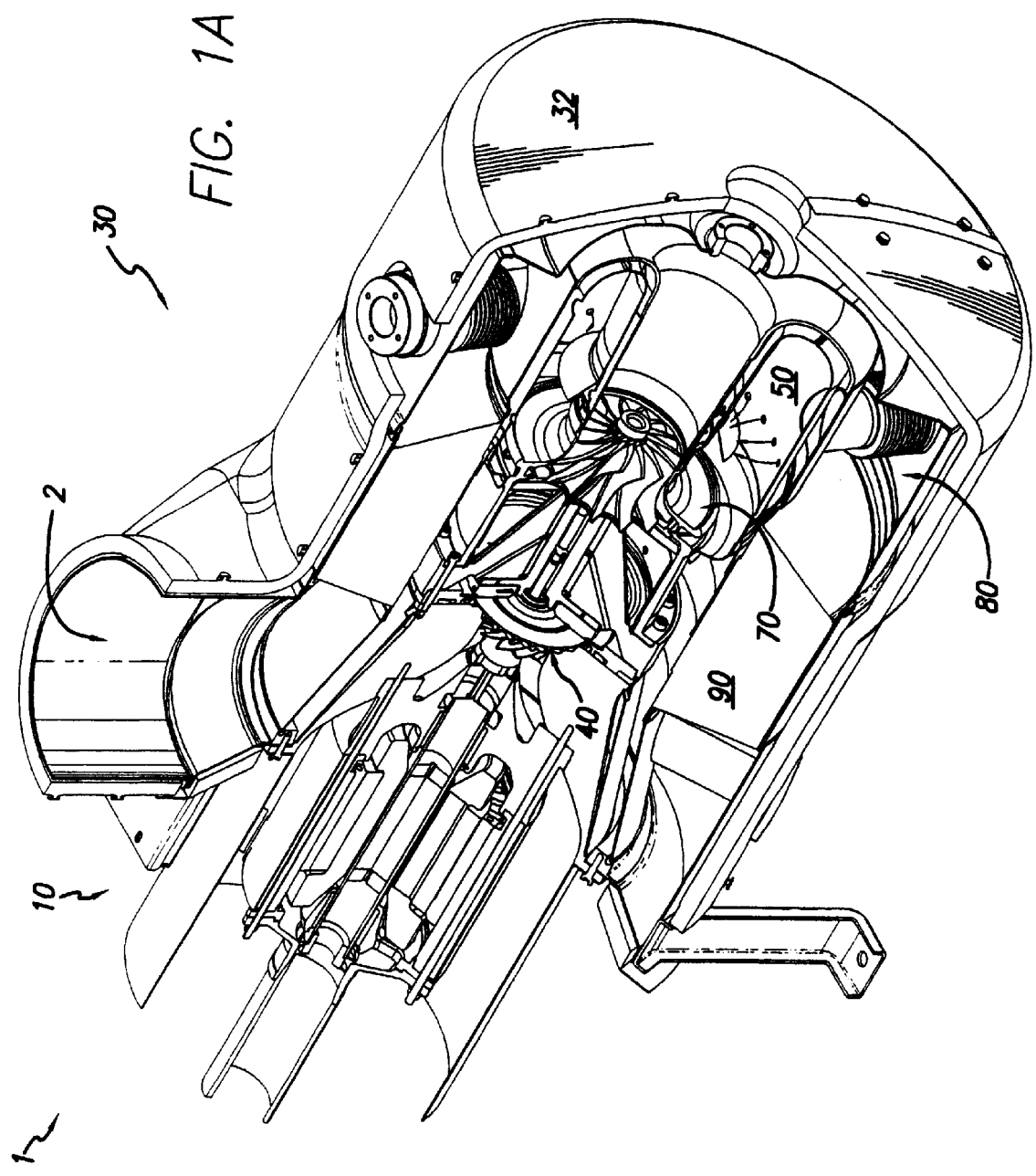

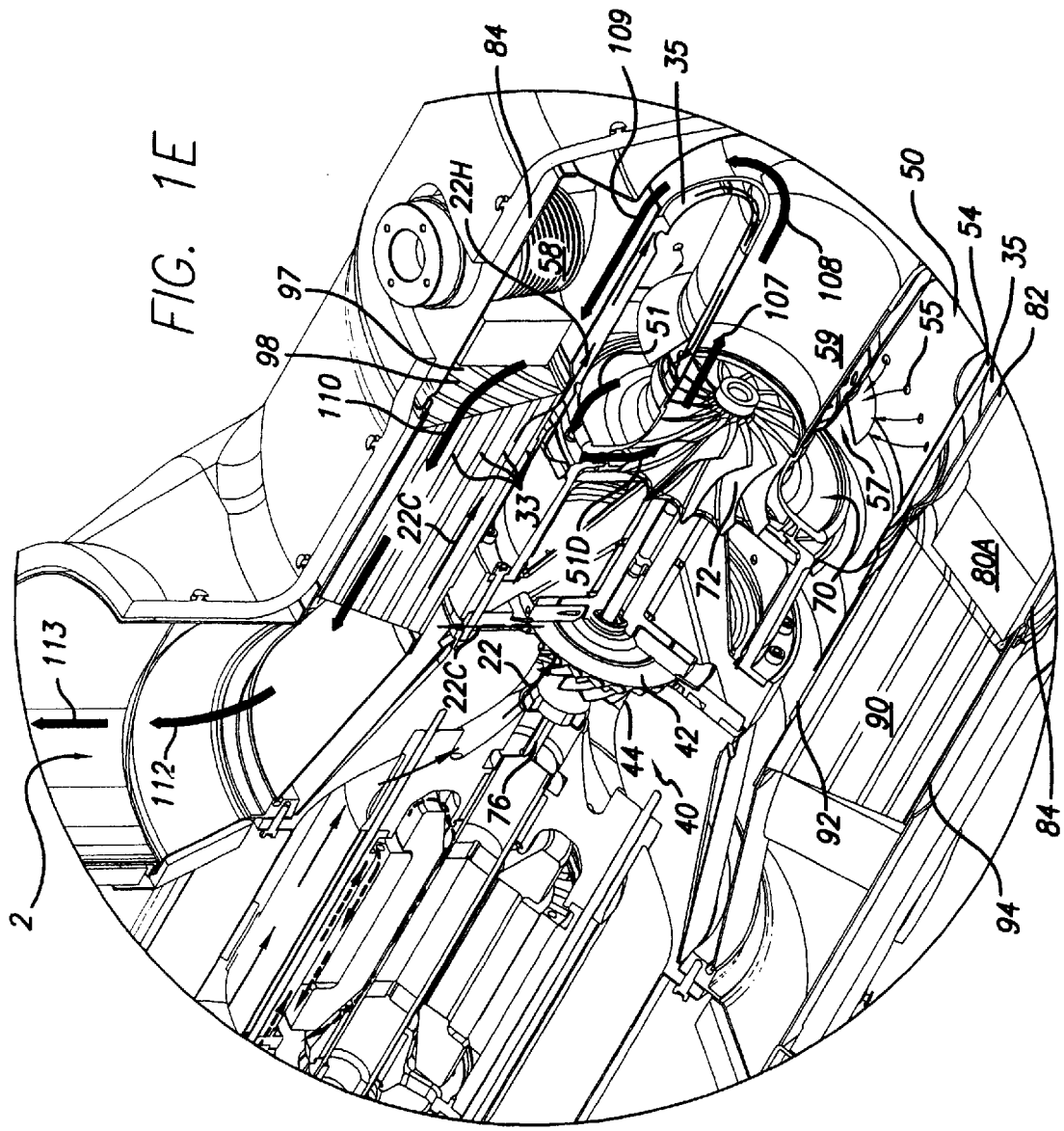

GENERATED SYSTEM BOTTOMING CYCLE

CROSS-REFERENCES TO RELATED APPLICATIONS

This application related to U.S. Provisional Application Ser. No. 60/246,135, filed on Nov. 6, 2000; U.S. Pat. No. 6,037,687, filed on Mar. 14, 2000; U.S. Pat. No. 5,964,663, filed on Oct. 12, 1999; U.S. Pat. No. 5,791,868, filed on Aug. 11, 1998; and U.S. Pat. No. 5,529,398, filed on Jun. 25, 1996, all of which are incorporated in their entirety by reference.

BACKGROUND OF THE INVENTION

1. Field of the Invention

The present invention relates to a closed loop Rankine bottoming cycle for a generator system, and more particularly to a recuperated or simple cycle MICRO-TURBINE engine, MICRO-TURBINE/fuel cell hybrid engine or individual fuel cells of various types.

2. Discussion of the Background

Many businesses, manufacturing companies, homeowners, etc., use generators in addition to power delivered by the local electric power company (also referred to as a utility grid). During operation of the generators, excess oxide gases, for example, are exhausted into the atmosphere.

Further, the gases exhausted into the atmosphere must meet strict environmental regulations. This increases the complexity and cost of operating of non-utility generators connected with a utility grid.

SUMMARY OF THE INVENTION

The present invention solves the above-noted and other problems by providing a novel closed loop Rankine bottoming cycle including a heat exchanger coupled to an exhaust port of a first turbogenerator for heating a pressurized refrigerant into a gaseous phase, and a second turbogenerator (e.g., a turbo expander) coupled to the heat exchanger for expanding the gaseous phase so as to create power. Also included is a cooling mechanism coupled to an exhaust of the second turbogenerator for cooling the gaseous phase exhausted by the second turbogenerator into a liquid phase, and a pumping mechanism for pressurizing the liquid phase into the pressurized refrigerant heated by the heat exchanger.

The present invention also includes a method and computer program product for operating and synchronizing the generator included in the closed loop, so as to optimize the overall system efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is perspective view, partially in section, of an integrated turbogenerator system.

FIG. 1E is a magnified perspective view, partially in section, of the compressor-turbine portion of the integrated turbogenerator of FIG. 1A.

DETAILED DESCRIPTION OF THE PREFERRED EMBODIMENT(S)

Figure 1B:
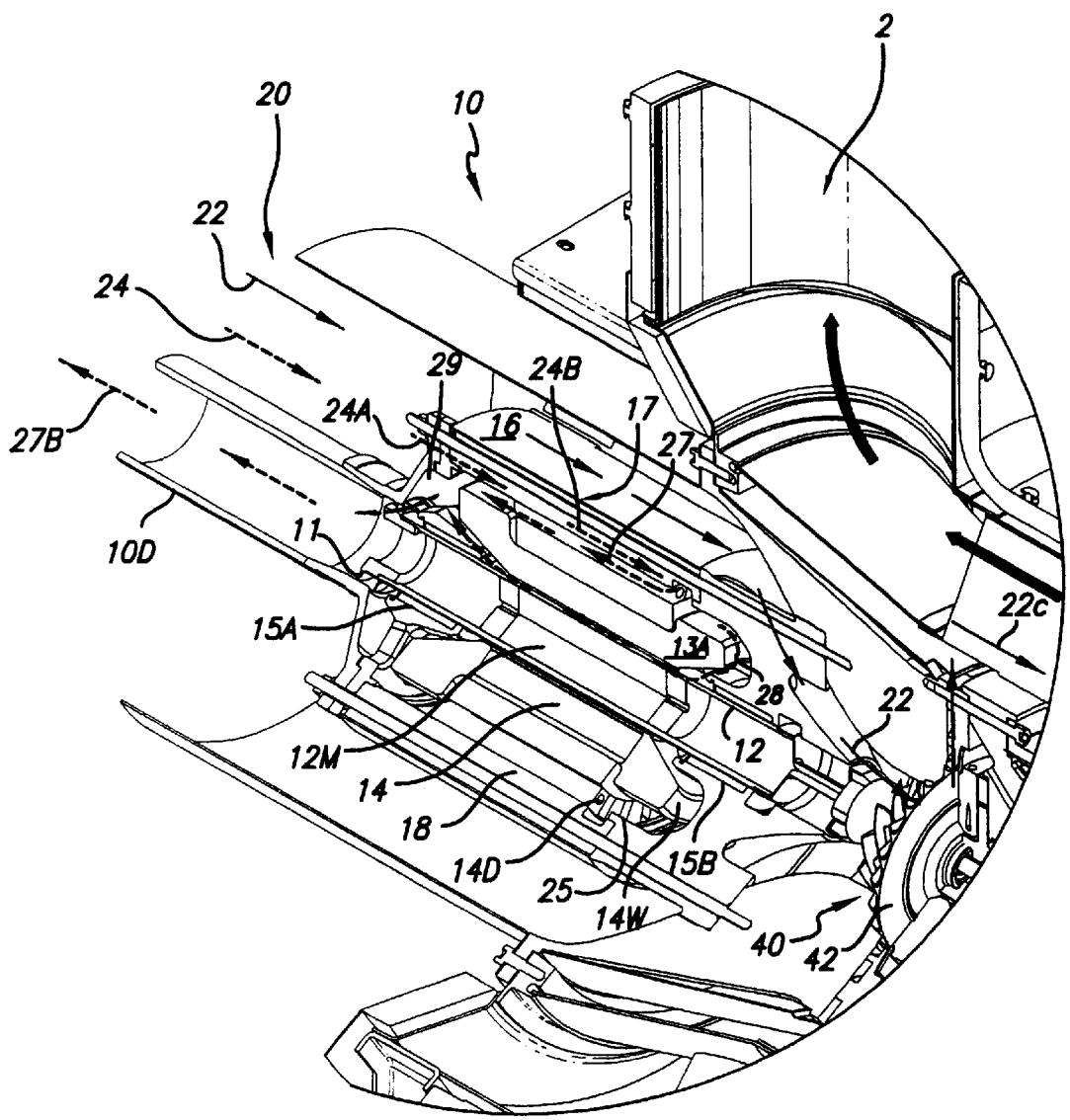
FIG. 1B is a magnified perspective view, partially in section, of the motor/generator portion of the integrated turbogenerator of FIG. 1A.

With reference to FIG. 1A, an integrated turbogenerator 1 according to the present disclosure generally includes motor/generator section 10 and compressor-turbine section 30. Compressor-turbine section 30 includes exterior can 32, compressor 40, combustor 50 and turbine 70. A recuperator 90 may be optionally included.

Figure 1C:
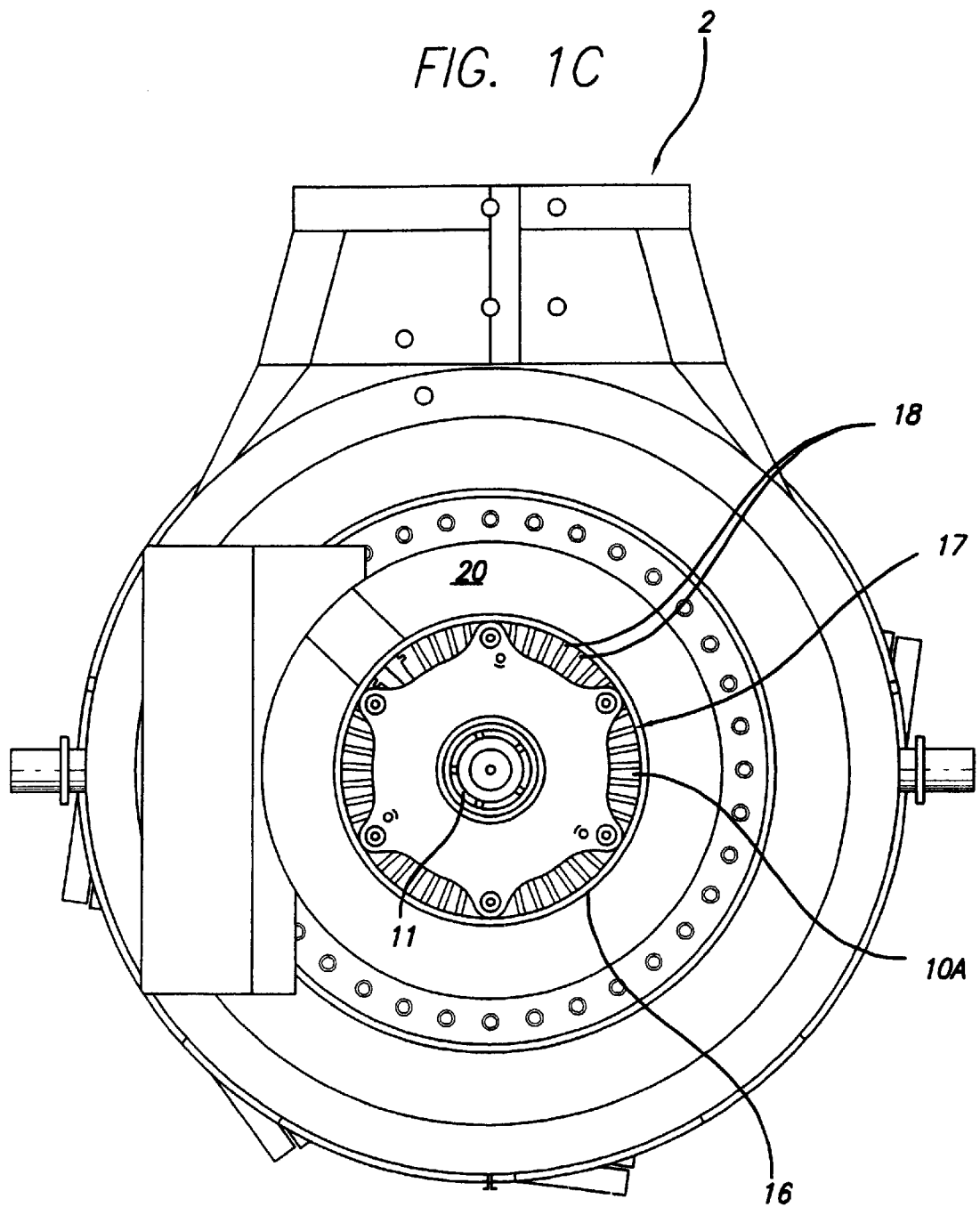
FIG. 1C is an end view, from the motor/generator end, of the integrated turbogenerator of FIG. 1A.

Referring now to FIG. 1B and FIG. 1C, in a currently preferred embodiment of the present disclosure, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
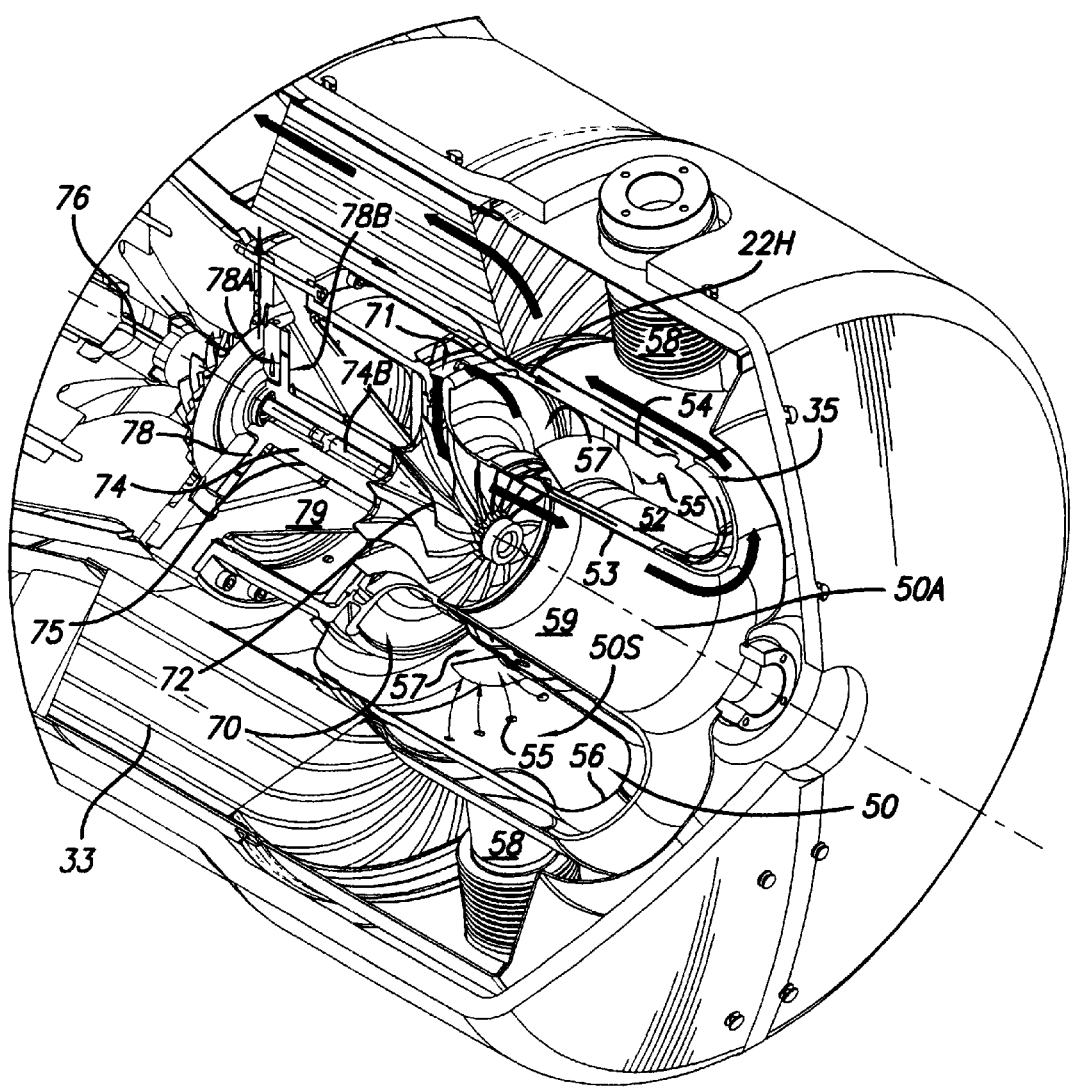
FIG. 1D is a magnified perspective view, partially in section, of the combustor-turbine exhaust portion of the integrated turbogenerator of FIG. 1A.
Figure 2:
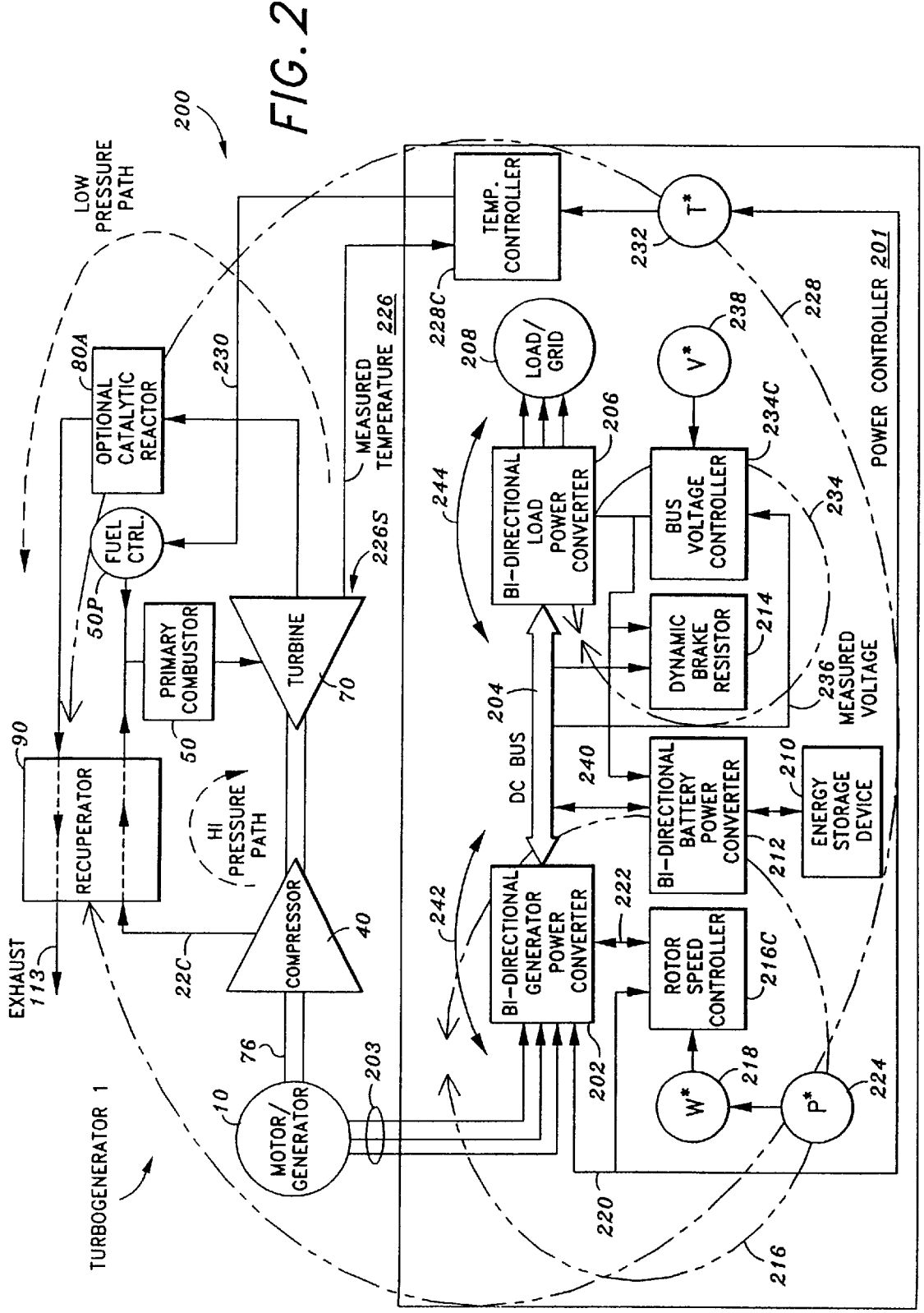
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 50A. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, bearing rotor 74 and compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17. into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 97 of recuperator 90, as indicated by gas flow arrows 108 and 109 respectively.

In an alternate embodiment of the present disclosure, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein are preferably but not necessarily used in connection with a turbogenerator, and preferably but not necessarily used in connection with an integrated turbogenerator.

Control System

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Figure 3:
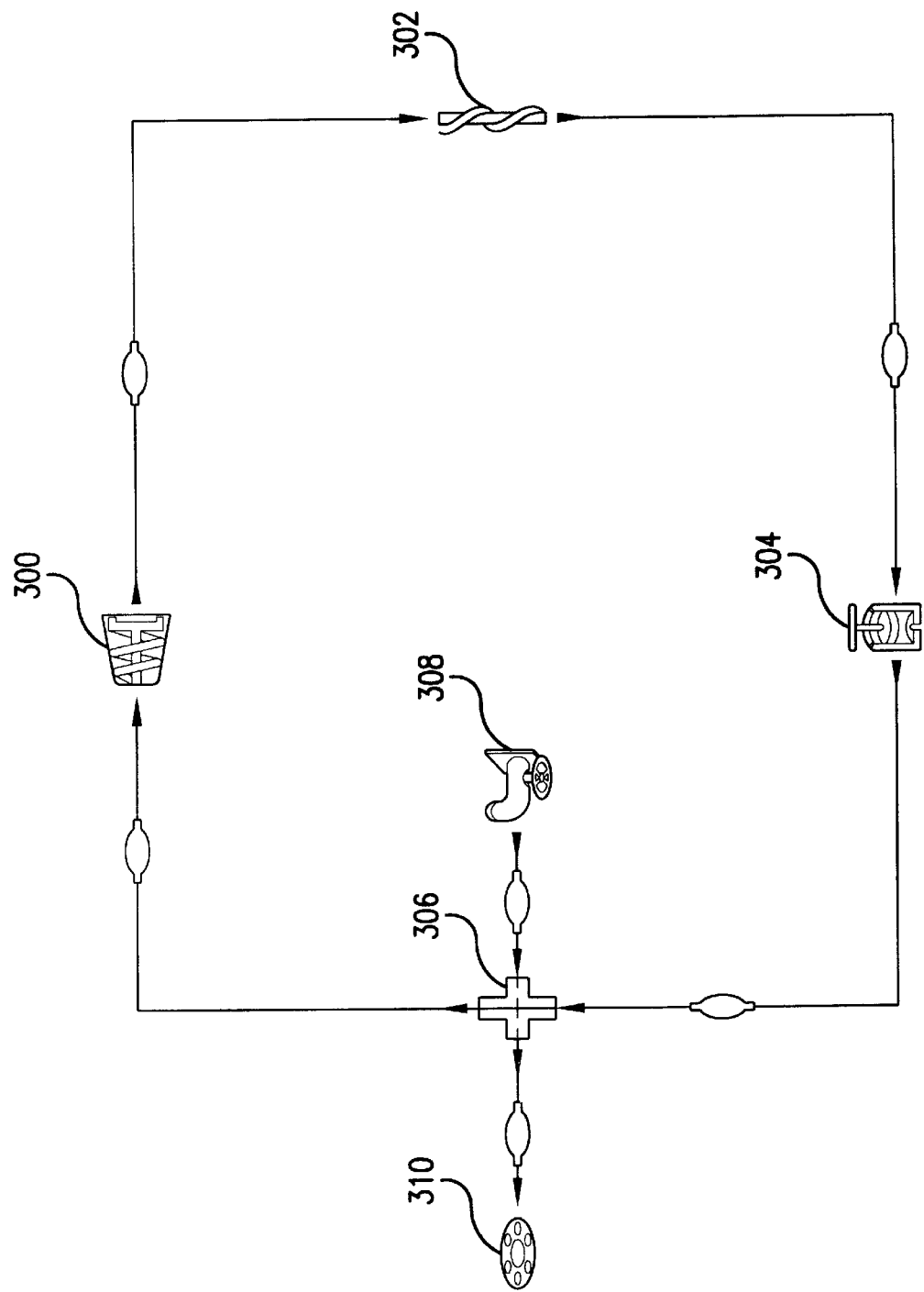
FIG. 3 is a schematic illustrating a closed loop Rankine bottoming cycle for a generator system according to the present invention.

Turning now to FIG. 3, which illustrates a closed loop Rankine bottoming cycle according to the present invention. As shown, the closed loop bottoming cycle includes a heat exchanger 306 coupled to an exhaust port 308 of a first turbogenerator (e.g., the exhaust 113 of the turbogenerator 1 illustrated in FIG. 2). The first turbogenerator may also be a recuperated or simple cycle MICRO-TURBINE engine, MICRO-TURBINE/fuel cell hybrid engine or individual fuel cells of various types. The heat exchanger 306 is a fluid container including a high pressure refrigerant.

Also included is a second turbogenerator 300 coupled to the heat exchanger 306 for expanding the gaseous phase created by the heat exchanger so as to create power. In more detail, the exhaust from the first turbogenerator is used to heat the high pressure refrigerant included in the heat exchanger. The pressurized refrigerant included in the heat exchanger 306 is converted into a gaseous phase and the temperature of the gas is also significantly raised. The high pressure gases are then expanded through the second turbogenerator 300 to create power for generating electricity and/or driving the refrigerant compressor (not shown) included in the heat exchanger. The excess gas on the downstream side of the second turbogenerator 300 is passed through a cooler 302 so that the gas is cooled back down to its liquid or primarily liquid phase. The gas may be cooled using external cool air, for example.

The liquid is then pumped up to a high pressure state before it reenters the heat exchanger 306 via a pumping mechanism 304. The pumping mechanism 304 can be either electrically driven or driven mechanically by the second turbogenerator 300. The pumping mechanism 304 may also use gas foil bearings, such as those disclosed in U.S. Pat. Nos. 5,529,398 and 5,791,868, both of which are incorporated in their entirety by reference.

Also included is a heat sink 310 coupled to the heat exchange 306 for discharging excess heat output from the heat exchanger 306. Alternatively, the excess heat output from the heat exchanger 306 may be exhausted into the atmosphere. The first turbogenerator (e.g., MICRO-TURBINE) may be operated on a variety of fuels including natural gas, propane, hydrogen, bio gas, kerosine and diesel, for example. Further, the first turbogenerator may be driven from a variety of external heat sources such as solar energy or wood burning gas fires.

The second turbogenerator 300 is preferably a small high speed expander (turbo expander) in the form of a radial turbine, axial turbine or Pellet wheel type of turbine that is optimized for the bottoming cycle. At part load conditions, the rotating speed of the turbo expander shaft is configured to vary so as to optimize the performance of the turbo expander. This feature will be discussed in more detail later.

The second turbogenerator 300 also directly drives a permanent magnet generator so as to create the alternating current. The permanent magnet generator may be integral to the rotor shaft or attached with a coupling device such as the double diaphragm shaft disclosed in U.S. Pat. Nos. 5,964, 663 and 6,037,687, both of which are incorporated in their entirety herein.

Thus, according to the closed loop Rankine bottoming cycle of the present invention, the exhaust from the MICRO-TURBINE or fuel cell (first turbogenerator) is used to heat the high pressure refrigerant via the heat exchanger 308 which is converted into an alternating current by the second turbogenerator 300. Therefore, the heat from the exhaust of the MICRO-TURBINE 308 is not wasted, but is utilized so as to produce additional power. Further, the disclosed closed loop Rankine bottoming cycle according to the present invention has not previously been applied to generators as there was generally insufficient exhaust heat to produce a required output power, and because the overall system efficiency did not warrant practical implication.

According to the present invention, however, a high speed expander is used in combination with a MICRO-TURBINE generator system, for example, and the turbo expander (second turbogenerator 300) is controlled so as to be synchronized with the first turbogenerator (such as the MICRO-TURBINE or the fuel cell). To accomplish efficient synchronization, the present invention includes control software which optimizes the system efficiency for the required load by adjusting the MICRO-TURBINE and bottoming cycle. In addition, the power and speed or the turbo expander may be controlled by adjusting the drive speed of compressor if it is electrically driven or by using a flow control valve if it is mechanically driven by the turbine expander. A diverter valve may also be required to divert the MICRO-TURBINE or fuel cell exhaust away from the bottoming cycle heat exchanger when the bottoming cycle is shut down, needs to operate at a reduced power, or the heat needs to be controlled to prevent damage to the bottoming cycle components or refrigerant. The diverter valve may be controlled by maintaining the maximum refrigerant temperature at a constant temperature.

Figure 4:
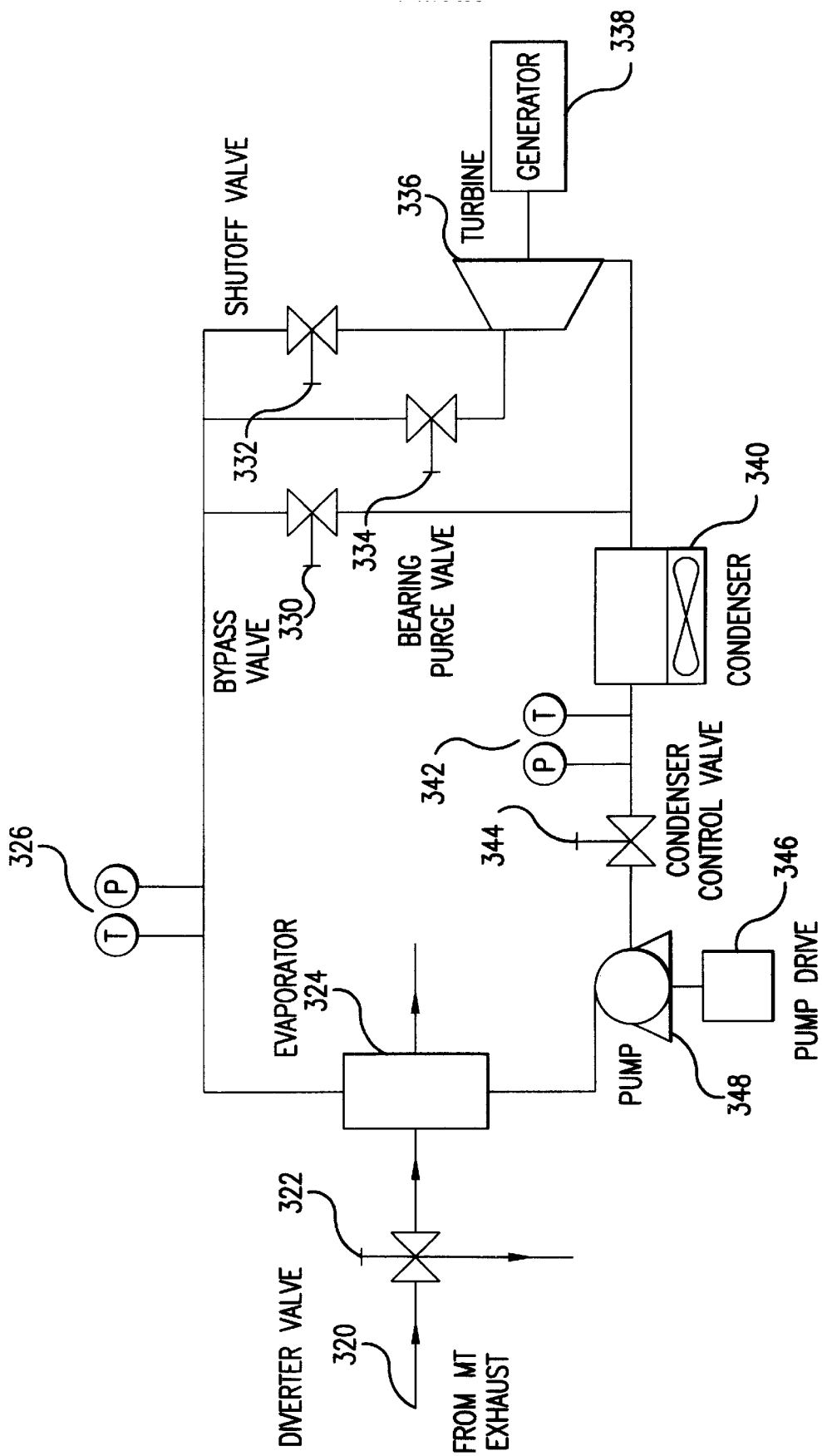
FIG. 4 is schematic illustrating an alternative closed loop Rankine bottoming cycle for a generator system according to the present invention.

For example, FIG. 4 illustrates an alternative closed loop Rankine bottoming cycle for optimal performance. As shown, the cycle includes a diverter valve 322 for diverting exhaust 320 from a MICRO-TURBINE, an evaporator 324, temperature and pressure sensors 326, a bypass valve 330, a shut-off valve 332, a bearing purge valve 334, a turbine 336, and a generator 338. Also included is a condenser 340, a condenser control valve 344, a pump drive 346 and a pump 348. The bottoming cycle shown in FIG. 4 operates in a similar fashion as that as shown in FIG. 3. However, for optimal cycle efficiency over a wide range of temperatures, the bottoming cycle in this arrangement is designed to allow the condenser pressure to vary, which in turn lets the dew point vary. Preferably, for optimal performance out of the cycle for a given design ambient temperature, the dew point in the condenser should be as close to ambient temperature as possible. Due to practical limitations on the size and cost of the condenser, the dew point is selected to be a certain temperature delta above the ambient temperature. For example, if the design temperature is 60° F., 80° F. may be selected as the dew point of the condenser. However, this limits the operation of the cycle. That is, at temperatures much over 60° F., the cycle may stop working because a significant amount of the intake to the pump 348 may be in a gas phase. In order for the cycle to work to an ambient temperature of 120° F., the condenser would have to be designed for a dew point of 140° F. Designing the condenser for a dew point of 140° F. significantly limits the performance of the cycle at 60° F.

To solve this problem, the present invention designs the cycle to have a varying condenser pressure. In this design, the condenser pressure can be varied to change the dew point to the optimal condition. One example of varying the condenser pressure is to put a condenser control valve 344 between the condenser 340 and the inlet to the pump 348. The bottom side pressure can then be adjusted by varying the condenser control valve 344 position, the speed of the pump drive 346 (if it is a dynamic pump, the pump head will increase with speed), and the speed of the turbine 336. The turbine speed will be adjusted to maintain a constant expansion ratio across the turbine. This technique can also be used when an economizer is added to the cycle. Depending on the pressure drop characteristics of the system, it may be possible to remove the condenser control valve 344.

Further, the previous description referring to FIG. 3 indicates the condenser can be cooled by a heat sink, or via ambient air. Another alternative is to use a water loop, or an external cooling tower. In addition, another way to improve the efficiency of the microturbine/bottoming cycle insulation is to use the waste heat from the condenser 340 to heat hot water for another process (such as for heating hot water included in the manufacturing facility). By using the control technique discussed above, the dew point and condenser can be varied to give a prescribed water outlet temperature. In general, the higher the outlet temperature, the lower the available power from the bottoming cycle since the condenser pressure has to be increased with an increased water outlet temperature.

In addition, because the first generator is generally a non-utility generator (i.e., a generator connected to a utility-grid), the energy captured by the second turbogenerator 300 may be used to feed other devices collocated with the non-utility turbogenerator, such as a heating system, for example. For example, a 10,000 square foot manufacturing plant may include two MICRO-TURBINE generators to provide power to the plant. In addition to power provided by the local electric company. According to the present invention, the excess exhaust from the two MICRO-TURBINE generators is captured and processed so as to produce additional power to drive other devices collocated with the two MICRO-TURBINE generators such as a heating system for the manufacturing plant.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention also includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A closed loop Rankine bottoming cycle, comprising:
   a heat exchanger coupled to an exhaust port of a first turbogenerator, and configured to heat a pressurized refrigerant into a gaseous phase, wherein the first turbogenerator is a variable speed Brayton cycle turbogenerator;
   a second turbogenerator coupled to the heat exchanger, and configured to expand the gaseous phase so as to create power, wherein the second turbogenerator is a variable speed Rankine cycle turbogenerator;
   a cooling mechanism coupled to an exhaust of the second turbogenerator, and configured to cool the gaseous phase exhausted by the second turbogenerator into a liquid phase; and
   a pumping mechanism configured to pressurize the liquid phase into the pressurized refrigerant heated by the heat exchanger, wherein the pumping mechanism receives the liquid phase solely from the cooling mechanism and supplies the liquid phase to the heat exchanger.

2. The closed loop Rankine bottoming cycle according to claim 1, further comprising:
   a heat sink coupled to the heat exchanger and configured to discharge excess heat output from the heat exchanger.

3. The closed loop Rankine bottoming cycle according to claim 1, wherein the first turbogenerator is a MICRO-TURBINE generator.

4. The closed loop Rankine bottoming cycle according to claim 1, wherein the second turbogenerator is a turbo expander comprising one of a radial turbine, an axial turbine, and a Pelton wheel turbine.

5. The closed loop Rankine bottoming cycle according to claim 4, wherein a rotating speed of a turbo expander shaft included in the turbo expander is configured to vary so as to optimize a performance of the turbo expander.

6. The closed loop Rankine bottoming cycle according to claim 4, wherein the turbo expander directly drives a permanent magnet generator.

7. The closed loop Rankine bottoming cycle according to claim 4, wherein the permanent magnet generator is integral with a turbine rotor shaft included in the turbo expander.

8. The closed loop Rankine bottoming cycle according to claim 4, wherein the permanent magnet generator is coupled with a turbine rotor shaft included in the turbo expander via a coupling mechanism.

9. The closed loop Rankine bottoming cycle according to claim 8, wherein the coupling mechanism comprises a CAPSTONE double diaphragm.

10. The closed loop Rankine bottoming cycle according to claim 4, wherein the turbo expander is hermetically sealed.

11. The closed loop Rankine bottoming cycle according to claim 4, wherein the pumping mechanism is mechanically driven by the turbo expander.

12. The closed loop Rankine bottoming cycle according to claim 1, wherein the pumping mechanism is electrically driven by an external electric power source.

13. The closed loop Rankine bottoming cycle according to claim 1, wherein the pumping mechanism comprises a CAPSTONE foil bearing compressor.

14. The closed loop Rankine bottoming cycle according to claim 1, wherein the first turbogenerator comprises a non-utility turbogenerator and the power created by the second turbogenerator feeds other devices collocated with the non-utility turbogenerator.

15. The closed loop Rankine bottoming cycle according to claim 1, further comprising:
   a condenser control valve disposed between the cooling mechanism and an inlet of the pumping mechanism; and
   a control mechanism configured to vary a condensing pressure in the cooling mechanism so as to also vary a dew point.

16. The closed loop Rankine bottoming cycle according to claim 15, wherein the control mechanism varies the condenser control valve, a speed of the pumping mechanism, and a speed of the second turbogenerator for optimal cycle efficiency.

17. The closed loop Rankine bottoming cycle according to claim 16, wherein the control mechanism comprises a computer program product.

18. A method of operating a closed loop Rankine bottoming cycle, comprising:
   heating a pressurizing refrigerant into a gaseous phase via a heat exchanger coupled to an exhaust port of a first turbogenerator, wherein the first turbogenerator is a variable speed Brayton cycle turbogenerator;
   expanding the gaseous phase so as to create power via a second turbogenerator coupled to the heat exchanger;
   cooling the gaseous phase exhausted by the second turbogenerator into a liquid phase via a cooling mechanism coupled to an exhaust of the second turbogenerator, wherein the second turbogenerator is a variable speed Rankine cycle turbogenerator; and
   pressurizing the liquid phase into the pressurized refrigerant heated by the heat exchanger via a pumping mechanism, wherein the pumping mechanism receives the liquid phase solely from the cooling mechanism and supplies the liquid phase to the heat exchanger.

19. The method according to claim 18, further comprising:
   discharging excess heat output from the heat exchanger via a heat sink coupled to the heat exchanger.

20. The method according to claim 18, wherein the first turbogenerator is a MICRO-TURBINE generator.

21. The method according to claim 18, wherein the second turbogenerator is a turbo expander comprising one of a radial turbine, an axial turbine, and a Pelton wheel turbine.

22. The method according to claim 21, further comprising:
   varying a rotating speed of a turbo expander shaft included in the turbo expander so as to optimize a performance of the turbo expander.

23. The method according to claim 21, wherein the turbo expander directly drives a permanent magnet generator.

24. The method according to claim 21, wherein the permanent magnet generator is integral with a turbine rotor shaft included in the turbo expander.

25. The method according to claim 21, wherein the permanent magnet generator is coupled with a turbine rotor shaft included in the turbo expander via a coupling mechanism.

26. The method according to claim 25, wherein the coupling mechanism comprises a CAPSTONE double diaphragm.

27. The method according to claim 21, wherein the turbo expander is hermetically sealed.

28. The method according to claim 21, wherein the pumping mechanism is mechanically driven by the turbo expander.

29. The method according to claim 18, wherein the pumping mechanism is electrically driven by an external electric power source.

30. The method according to claim 18, wherein the pumping mechanism comprises a CAPSTONE foil bearing compressor.

31. The method according to claim 18, wherein the first turbogenerator comprises a non-utility turbogenerator and the power created by the second turbogenerator feeds other devices collocated with the non-utility turbogenerator.

32. The method according to claim 18, further comprising:
disposing a condenser control valve between the cooling mechanism and an inlet of the pumping mechanism; and
varying the condenser valve, via a control mechanism, so as to vary a condensing pressure in the cooling mechanism and also vary a dew point.

33. The method according to claim 32, wherein the control mechanism varies the condenser control valve, a speed of the pumping mechanism, and a speed of the second turbogenerator for optimal cycle efficiency.

34. The method according to claim 33, wherein the control mechanism comprises a computer program product.

35. A system of operating a closed loop Rankine bottoming cycle, comprising:
means for heating a pressurized refrigerant into a gaseous phase and being coupled to an exhaust port of a first turbogenerator, wherein the first turbogenerator is a variable speed Brayton cycle turbogenerator;
means for expanding the gaseous phase so as to create power and being coupled to the heat exchanger;
means for cooling the gaseous phase exhausted by a second turbogenerator into a liquid phase and being coupled to an exhaust of the second turbogenerator, wherein the second turbogenerator is a variable speed Rankine cycle turbogenerator; and
means for pressurizing the liquid phase into the pressurized refrigerant heated by the heating means, wherein the pressurizing means receives the liquid phase solely from the cooling means and supplies the liquid phase to the heating means.

36. The system according to claim 35, further comprising:
means for discharging excess heat output from the heating means and being coupled to the heating means.

37. The system according to claim 35, wherein the first turbogenerator is a MICRO-TURBINE generator.

38. The system according to claim 35, wherein the second turbogenerator is a turbo expander comprising one of a radial turbine, an axial turbine, and a Pelton wheel turbine.

39. The system according to claim 38, further comprising:
means for varying a rotating speed of a turbo expander shaft included in the turbo expander so as to optimize a performance of the turbo expander.

40. The system according to claim 38, wherein the turbo expander directly drives a permanent magnet generator.

41. The system according to claim 38, wherein the permanent magnet generator is integral with a turbine rotor shaft included in the turbo expander.

42. The system according to claim 38, wherein the permanent magnet generator is coupled with a turbine rotor shaft included in the turbo expander via a coupling means.

43. The system according to claim 42, wherein the coupling means comprises a CAPSTONE double diaphragm.

44. The system according to claim 38, wherein the turbo expander is hermetically sealed.

45. The system according to claim 38, wherein the pumping means is mechanically driven by the turbo expander.

46. The system according to claim 35, wherein the pumping means is electrically driven by an external electric power source.

47. The system according to claim 35, wherein the pumping means comprises a CAPSTONE foil bearing compressor.

48. The system according to claim 35, wherein the first turbogenerator comprises a non-utility turbogenerator and the power created by the second turbogenerator feeds other devices collocated with the non-utility turbogenerator.

49. The system according to claim 35, further comprising:
means for varying a condensing pressure in the cooling means so as to also vary a dew point.

50. The system according to claim 49, wherein the varying means varies a condenser control valve disposed between the cooling means and pumping means, a speed of the pumping means, and a speed of the second turbogenerator for optimal cycle efficiency.

51. The system according to claim 49, wherein the varying means comprises a computer program product.

* * * * *